Jan. 8, 1946. E. H. STIVENDER 2,392,426
REGULATING SYSTEM FOR DYNAMO-ELECTRIC MACHINES
Filed April 3, 1941

Inventor
Edward H. Stivender
by Didier Journeaux
Attorney

Patented Jan. 8, 1946

2,392,426

UNITED STATES PATENT OFFICE 2,392,426

REGULATING SYSTEM FOR DYNAMO-ELECTRIC MACHINES

Edward H. Stivender, West Allis, Wis., assignor to Allis-Chalmers Manufacturing Company, Milwaukee, Wis., a corporation of Delaware Application April 3, 1941, Serial No. 386,666

7 Claims. (Cl. 171—119)

This invention relates in general to improvements in the regulation of dynamo-electric machines and more particularly to the simultaneous regulation of a plurality of dynamo-electric machines connected in parallel to a common electric current circuit.

When a plurality of dynamo-electric machines are connected in parallel it is frequently desired to regulate the field currents of all the machines by means of a common control device. It is also generally advantageous to maintain a predetermined current distribution between the machines when they are used as generators or to maintain a predetermined ratio between their speeds when they are used as motors. Such results may be obtained by actuating all the field rheostats of the machines by a common motor through a suitable mechanical transmission, but when the different machines and their rheostats are of large capacities such transmission becomes impractical. When, however, the different rheostats are severally actuated by geared electric motors of the usual type it is not feasible to obtain exactly the corresponding displacements of the different rheostats necessary for the desired control of the machines. It is then necessary to additionally control the machine rheostats in dependence upon a characteristic of the current distribution between the machines or in response to their relative speeds.

The above disadvantages may be obviated by providing each rheostat with an actuating motor of a type adapted to assume definite positions in dependence upon the magnitudes of the currents flowing through its windings and by controlling the motor currents through a control device on which the motor currents do not have any electrodynamic effect. In the preferred embodiment of the invention, the rheostat actuating motors are of the polyphase alternating current type and are connected with a source of direct current through a suitable resistor connected to form a voltage divider. By displacing the voltage divider taps, the currents in the windings of all the rheostat motors are varied in a predetermined manner so that the motors are all given displacements corresponding to those of the voltage divider taps. No torque is transmitted between the voltage divider and the motors, and the voltage divider taps may therefore be actuated by a low power actuating means such as a highly sensitive voltage responsive device.

It is therefore one object of the present invention to provide an improved regulating system for dynamo-electric machines in which a field rheostat of a machine may be remotely actuated in accordance with the displacements of a control device.

Another object of the present invention is to provide an improved regulating system for dynamo-electric machines in which the field rheostat of a machine may be caused to follow the displacements of a control device without transmission of torque therebetween.

Another object of the present invention is to provide an improved regulating system in which the field rheostats of a plurality of dynamo-electric machines may be remotely actuated in such manner as to be given corresponding displacements simultaneously.

Objects and advantages other than those above set forth will be apparent from the following description when read in connection with the accompanying drawing, in which:

Fig. 1 diagrammatically illustrates one embodiment of the present invention for controlling the field currents of a plurality of parallel connected alternating current generators;

Figure 1:
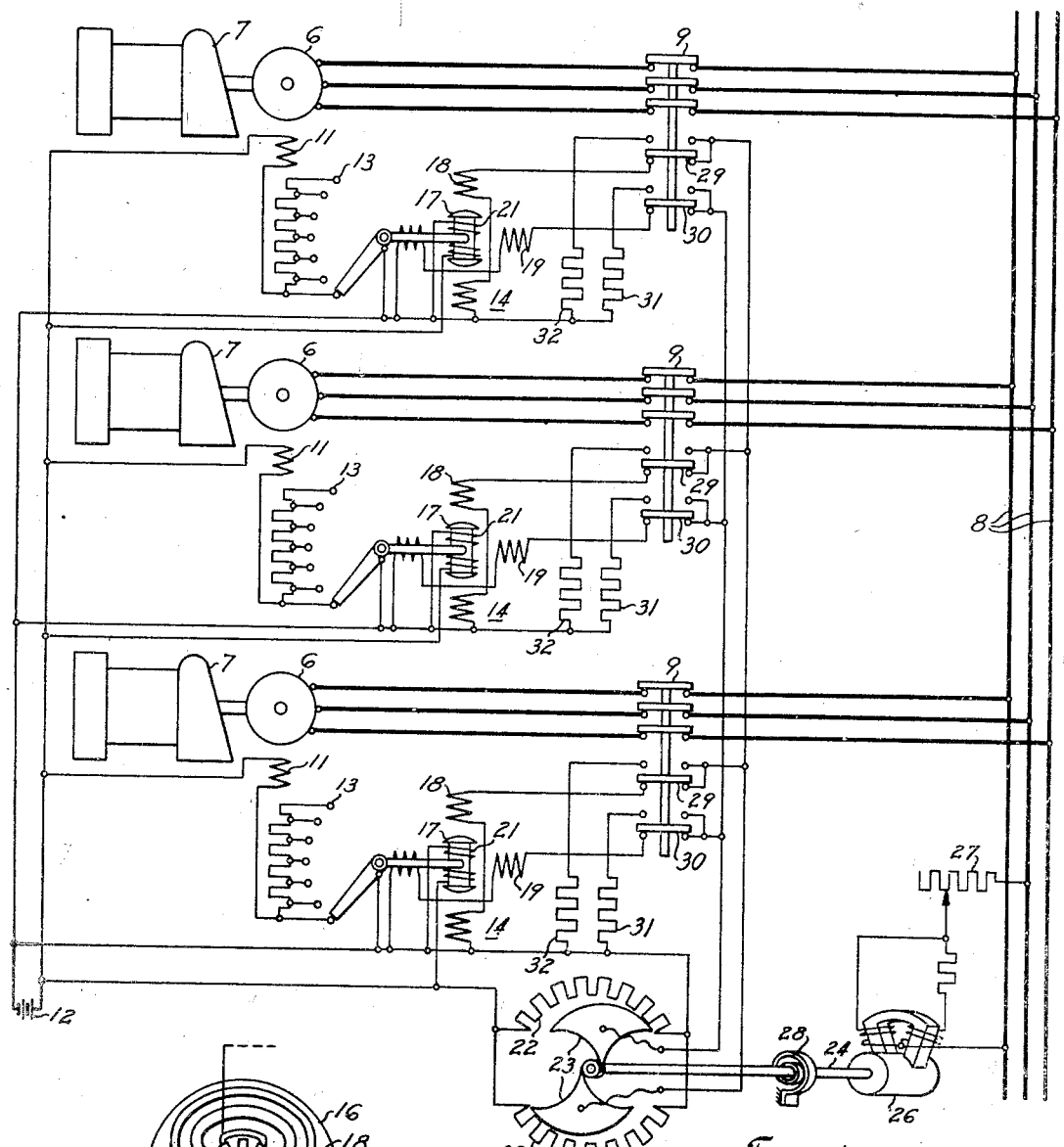
Figure 2:
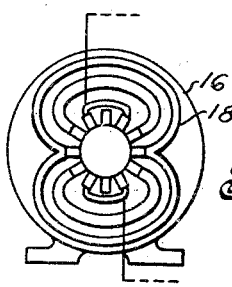
Fig. 2 is an end view of the stator of the preferred type of rheostat motor utilized in the system of Fig. 1 showing the end connections of one of the stator windings.
Figure 4:
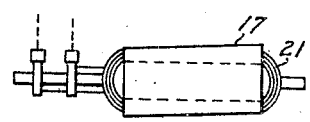
Fig. 4 is a plan view of the rotor of the preferred rheostat motor.
Figure 3:
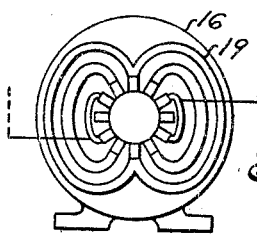
Fig. 3 is a view similar to Fig. 2 showing the end connections of the other stator winding.

The system illustrated in Fig. 1 comprises a plurality of dynamo-electric machines 6 of the synchrnous alternating current type severally associated with suitable constant speed prime movers such as steam turbines 7. The machines are accordingly intended to operate as generators and may be connected with a suitable distribution circuit 8 through a plurality of switches 9. Circuit 8 in turn transmits current from the generators to suitable current consuming devices (not shown). Each generator is provided with a field winding 11 connected with any suitable source of excitation current such as direct current generator or a battery 12. The excitation currents of the different machines are severally controlled by a plurality of field rheostats 13.

The brush of each rheostat is actuated by a motor 14 of the polyphase alternating current synchronous type. Each motor comprises a stator member 16 and an associated rotor member 17. One of the members, the stator for example, is provided with a plurality of relatively displaced phase windings 18, 19. The windings may be arranged in any known manner but are preferably distributed in slots of the stator according to a sinusoidal law as disclosed in my copending application Serial No. 320,387, filed February 23, 1940. When the rotor is intended to be able to make at least one complete revolution, windings 18, 19 are arranged at ninety electrical degrees. In a two-pole machine the windings therefore have their magnetic axes at right angles to each other. If the rotor is not required to rotate beyond a fraction of a revolution, the two windings may be arranged at other angles within the limits of ninety degrees and one-hundred and eighty degrees. When more than two stator windings are provided, they are spaced uniformly along the bore of the stator.

The rotor may consist of an unwound block of magnetized or unmagnetized paramagnetic material, but is preferably provided with a winding 21 connected with battery 12. Winding 21 may be wound about a relatively flat portion of the rotor or may be arranged in slots similarly to windings 18, 19. The rotor and stator are preferably skewed relatively to each other to cause the motor to exert a substantially uniform torque regardless of the relative position of the rotor and the stator slots.

The windings of the different rheostat motors are connected in parallel and are energized from battery 12 through a resistor 22 connected to constitute a voltage divider. The resistor is preferably divided into two parallel portions connected with the terminals of battery 12. Each resistor portion is provided with a movable tap preferably consisting of a rocking sector 23, one sector being connected with one terminal of each of windings 18 and the other sector being connected with one terminal of each of windings 19.

The two sectors are arranged to be simultaneously actuated in variable engagement with resistor 22 by means of a rotary shaft 24. The shaft may be rotated manually or in response to any desired operating condition of generators 6 or of any apparatus associated therewith. In the embodiment illustrated, shaft 24 is arranged to be actuated by a torque motor 26 of the split phase alternating current type energized from circuit 8 through an adjusting rheostat 27 and acting against a suitable spring 28. Motor 26 may be provided with any suitable known damping or anti-hunting devices (not shown) to prevent overtravel thereof in response to sudden variations in the voltage of circuit 8. The connections between sectors 23 and windings 18, 19 may be controlled by auxiliary contacts 29, 30 of switches 9. When the switches are open, contacts 29, 30 may connect sectors 23 with battery 12 through resistors 31, 32 having substantially the same resistance as windings 18, 19.

The resistance of resistor 22 is preferably so distributed between the points of engagement of sectors 23 therewith that the currents through windings 19 and 18, respectively, vary as the sine and cosine of an angle proportional to the angular displacement of shaft 24 from the position shown. Such distribution of the resistor is advantageous in that it causes angular displacements of motors 14 proportional to those of motor 26. If a uniformly distributed resistor 22 is utilized the angular displacements of the different motors 14 remain predetermined, are equal to each other and correspond to the angular displacements of motor 26, but are not always proportional thereto.

In considering the operation of the system, it will be assumed at first that all generators 6 are identical and that their field rheostats are likewise identical. All the machines are connected with circuit 8 through their switches 9 and the machines will be assumed to deliver current of such magnitude as to require excitation of the field windings 11 at the full voltage of battery 12. Rheostat 27 is so adjusted that torque motor 26 then balances the resisting force of spring 28 while maintaining sectors 23 in the extreme position shown.

The sectors then maintain windings 19 short circuited and impress the full voltage of battery 12 on windings 18. The magnetic action of windings 18 on the rotors 17 maintains the rotors in alinement with the magnetic axis of windings 18. With the rotors in this position, the connections between the rotor shafts and the brushes of the rheostats are so adjusted that the rheostats are entirely removed from the field circuits. The governors of the turbines are so adjusted that all generators deliver equal currents to the load circuit as is usual in practice. As the field currents are all equal, there is no circulation of wattless current between machines and the machine currents are all equal.

If the voltage of circuit 8 rises because of a decrease in the loading thereof, for example, torque motor 26 overcomes the action of spring 28 and causes sectors 23 to rock on resistor 22. Windings 18, 19 are then all connected in parallel with portions of resistor 22. As a result thereof the currents through windings 18 decrease and windings 19 begin to carry current. The magnetic axis of each stator 16 is thereby caused to shift from winding 18 towards winding 19 to exert on the associated rotor 17 a torque causing the rotor to turn clockwise. Each rotor actuates the brush of the associated field rheostat to insert a portion of the rheostat in the corresponding field circuit. The common terminal voltage of the machines, which is impressed on torque motor 26 through circuit 8, is thereby gradually reduced.

After a predetermined displacement of sectors 23 a state of equilibrium is reached in which the torque of torque motor 26 is again equal to the torque of spring 28. Motor 26 then remains at standstill while maintaining sectors 23 in engagement with predetermined points of resistor 22 intermediate the terminals thereof. The currents through windings 18 and windings 19 are then maintained in a predetermined ratio.

The action of the stator windings on the rotors is then substantially as if the flow of current through windings 18 had remained unchanged and windings 18 had been displaced by an angle depending on the extent of movement of sectors 23. The rotors 17 are all simultaneously displaced by that angle and are maintained in the positions reached as a result of such displacements. The brushes of all the field rheostats are displaced by the motors to the same extent and the field currents are all reduced to a corresponding extent. Although the loading of the machine has changed, the distribution of load current between the machines is maintained by the turbine governors and the flow of circulating current between the machines is still precluded by the equality of the different field currents. The currents through the several machines accordingly remain uniform.

An action similar to that above described takes place in response to every change in the voltage of circuit 8. This voltage is thereby maintained substantially constant within the load limits for which rheostats 13 are designed. When the machines are completely unloaded, sectors 23 may reach the extreme position opposite to the position shown to completely short circuit windings 18 and to impress the full voltage of battery 12 on windings 19. Under such conditions rotors 17 are rotated to a position in line with the magnetic axis of windings 19 to insert the entire field rheostats in the field circuits. Under all operating conditions causing rotation of torque motor 26 to different positions, the rheostats are all moved simultaneously to a position corresponding to the position of torque motor 26 and of sectors 23 without requiring any correction. There is no transmission of torque between torque motor 26 and rheostat motors 14, and the flow of current through windings 18, 19 produces no reaction on the torque motor. The torque motor is only required to overcome the very slight amount of friction caused by movement of sectors 23 and may therefore be made highly sensitive to voltage variations.

If any one of generators 6 is to be maintained inoperative, the switch 9 associated therewith is opened. The contacts 29 and 30 of the switch disconnect the windings 18 and 19 controlled thereby and substitute therefor a pair of resistors 31, 32. The resistance of the circuit controlled by sectors 23 accordingly remains unchanged and the action of torque motor 26 therefore remains uniform regardless of the number of machines actually controlled thereby.

If the machines are not of uniform size, the resistance steps of the different field rheostats will generally be unequal, but they may be so dimensioned that the desired current distribution between the different machines is obtained for all positions of sectors 23 and of motors 14. If the rheostats are used for controlling the fields of direct current motors, the sectors 23 may be controlled in response to the speed of any of the motors to maintain the speed of all the motors uniform at a predetermined value.

Although but one embodiment of the present invention has been illustrated and described, it will be apparent to those skilled in the art that various modifications and changes may be made therein without departing from the spirit of the invention or from the scope of the appended claims.

It is claimed and desired to secure by Letters Patent:

1. In combination, an electric circuit, a plurality of dynamo-electric machines connected in parallel to said circuit and having field windings, a source of excitation current for said machines, a plurality of rheostats severally connecting said field windings with said source, each said rheostat being actuable into a plurality of operating positions, and means for positively actuating said rheostats simultaneously to cause said rheostats to have a predetermined positional relation to each other comprising a control member actuable into a plurality of control positions, and a plurality of electromagnetic means severally connecting said rheostats with said control member for causing each of said rheostats to assume operating positions having a predetermined relation to each control position of said control member.

2. In combination, an electric circuit, a plurality of dynamo-electric machines connected in parallel to said circuit and having field windings, a source of excitation current for said machines, a plurality of rheostats severally connecting said field windings with said source, each said rheostat being actuable into a plurality of operating positions, and means positively actuating said rheostats simultaneously to cause said rheostats to have a predetermined positional relation to each other comprising a source of electric current, a resistor and contact means actuable in variable engagement with said resistor at a plurality of control positions each in an invariable relation to each of said positions of said rheostats, a plurality of motors each comprising a stator member and a rotor member mechanically coupled to one of said rheostats, one of said members being provided with a plurality of distinct relatively displaced cooperating windings, all the said windings of the different said motors being continuously connected with the second said source through said resistor and contact means, whereby the positioning of said contact means in any of said control positions will result in the positioning of each of said rheostats in an invariable corresponding position.

3. In combination, an electric circuit, a plurality of dynam-electric machines connected in parallel to said circuit and having field windings, a source of excitation current for said machines, a plurality of rheostats severally connecting said field windings with said source, each of said rheostats being actuable into a plurality of operating positions, and means for positively actuating said rheostats simultaneously to cause said rheostats to have a predetermined positional relation to each other comprising a source of electric current, a resistor and contact means actuable in variable engagement with said resistor at a plurality of control positions each in an invariable relation to each of said positions of said rheostats, a plurality of motors each comprising a stator member and a rotor member mechanically coupled to one of said rheostats, one of said members being provided with a plurality of distinct relatively displaced cooperating windings, each of said windings having its active conductors distributed on said one of said members according to a sinusoidal law, all the said windings of the different said motors being continuously connected with the second said source through said resistor and contact means, whereby the positioning of said contact means in any of said control positions will result in the positioning of each of said rheostats in an invariable corresponding position.

4. In combination, a dynamo-electric machine comprising a field winding, a source of excitation current connected with said field winding, a rheostat for controlling said excitation current, a source of electric current, a resistor, contact means actuable in variable engagement with said resistor at a plurality of control positions, and means for positively actuating said rheostat into a plurality of operating positions each having an invariable relation to each of said control positions of said contact means including a motor comprising a stator member and a rotor member mechanically coupled to said rheostat, one of said members being provided with a plurality of distinct relatively displaced cooperating windings continuously connected with the second said source through said resistor and said contact means, whereby the positioning of said contact means in any of said control positions will result in the positioning of said rheostat in an invariable corresponding position.

5. In combination, a dynamo-electric machine comprising a field winding, a source of excitation current connected with said field winding, a rheostat for controlling said excitation current, a control member actuable into a plurality of control positions, and means for positively actuating said rheostat into a plurality of operating positions each having an invariable relation to each of said control positions of said control member comprising electromagnetic means connecting said rheostat with said control member, whereby the positioning of said control member in any of said control positions will result in the positioning of said rheostat in an invariable corresponding position.

6. In combination, a dynamo-electric machine comprising a field winding, a source of excitation current connected with said field winding, a rheostat for controlling said excitation current, a control member actuable into a plurality of control positions, an electric motor for actuating said rheostat, and means for positively causing said motor to assume a plurality of operating positions each having a predetermined relation to each of said control positions of said control member comprising a source of electric current connected with said motor for supplying operating current thereto and a member actuable independently of said operating current for regulating the value of said operating current, whereby the positioning of said control member in any of said control positions will result in the positioning of said motor in an invariable corresponding position.

7. In combination, a dyanmo-electric machine comprising a field winding, a source of excitation current connected with said field winding, a rheostat for controlling said excitation current, a source of electric current, a resistor, contact means actuable in variable engagement with said resistor at a plurality of control positions, and means for positively actuating said rheostat into a plurality of operating positions each having a predetermined relation to each of said control positions of said contact means including a motor comprising a stator member and a rotor member mechanically coupled to said rheostat, one of said members being provided with a plurality of distinct relatively displaced cooperating windings continuously connected with the second said source through said resistor and said contact means, each of said windings having its active conductors distributed on said one of said members according to a sinusoidal law, whereby the positioning of said contact means in any of said control positions will result in the positioning of said rheostat in an invariable corresponding position.

EDWARD H. STIVENDER.